Patented July 8, 1952

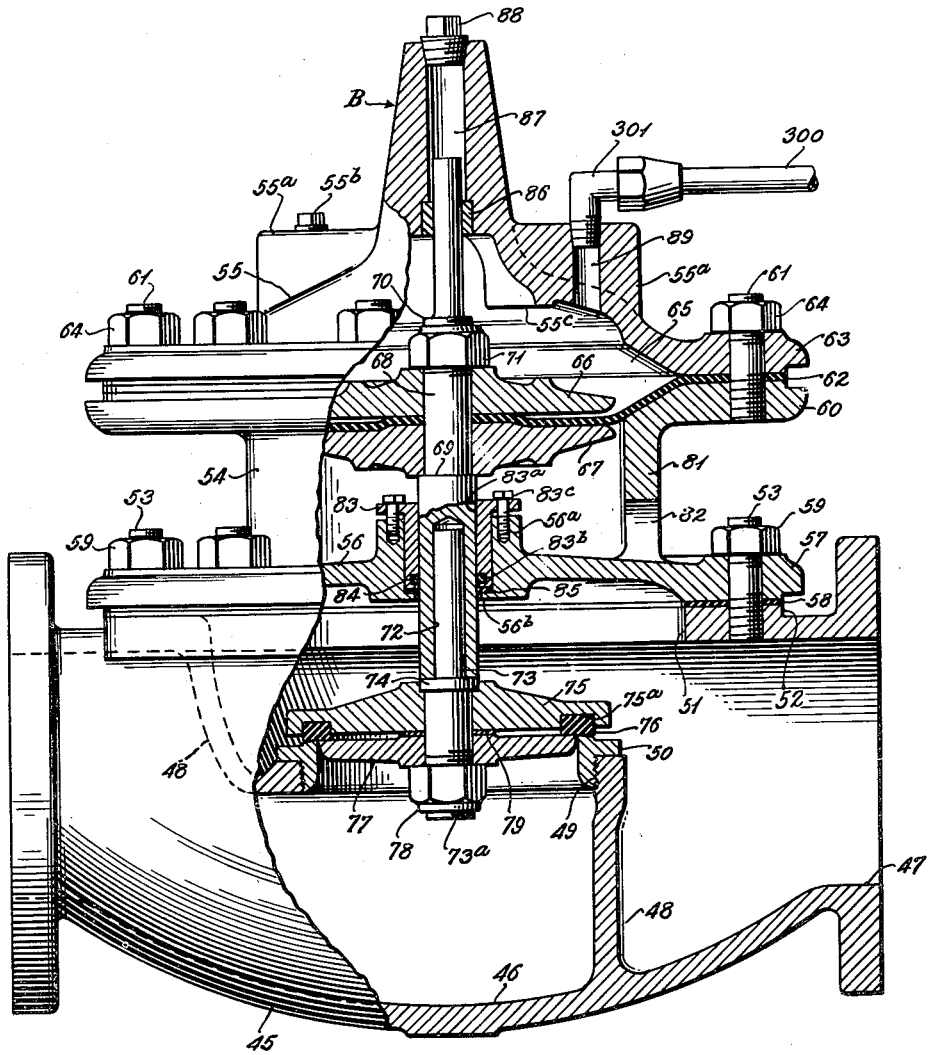

2,602,467

UNITED STATES PATENT OFFICE 2,602,467

POWER-OPERATED CHECK VALVE

Donald G. Griswold, Alhambra, Calif., assignor to Clayton Manufacturing Company, Alhambra, Calif., a corporation of California Original application May 21, 1945, Serial No. 595,007. Divided and this application May 21, 1945, Serial No. 595,004

1 Claim. (Cl. 137—688)

The present invention relates to check valves and more particularly to a "power-operated" (fluid pressure operated) check valve adapted to be employed in a backflow prevention unit such as disclosed in my application Serial No. 595,007, filed of even date herewith, and of which the instant application is a division. However, it is to be understood that the present valve is not limited to use in a backflow unit.

The principal object of the invention is to provide a check valve which will close automatically by gravity under a static line condition, and which can be positively closed and held closed against line pressure by operating fluid under pressure.

Another object of the invention is to provide a pressure fluid operated valve wherein it is impossible for the fluid in the pipe line in which the valve is connected to commingle with the operating fluid for the valve, and vice versa.

Still another object of the invention is to provide a valve construction including means for indicating that leakage is occurring along the valve stem from the outlet chamber of the valve.

A further object of the invention is to provide a diaphragm valve including means for indicating leakage along the valve stem connected with the diaphragm and for also indicating failure of the diaphragm.

Other objects and advantages of the invention will be apparent from the following description taken in conjunction with the accompanying drawing, in which the single figure of the drawing constitutes a view partly in section and partly in elevation of a combined gravity and power operated check valve constructed in accordance with the principles of the invention.

Referring to the drawing, the fluid pressure operated, or "power-operated," check valve is generally identified by the letter B and comprises a valve body 45 having an inlet opening or chamber 46 and an outlet opening or chamber 47 separated by a partition 48. The partition 48 is provided with a threaded opening 49 for the reception of a valve seat 50. The valve body 45 is further provided with a central opening 51 directly above the seat 50, said opening being surrounded by an annular boss 52 having a flat upper surface. A series of studs 53 is mounted in the boss 52.

The valve B further includes a generally cuplike intermediate section 54 and a cover 55. The intermediate section 54 has a transverse lower or bottom wall portion 56 which overlies the opening 51 in the body 45 and forms a closure for said opening, and also has a lower radial flange 57 in vertical alignment with the boss 52. A gasket 58 is disposed between the lower surface of the flange 57 and the boss 52 and a series of nuts 59 on the studs 53 secures the intermediate section 54 to the body 45 and compresses the gasket 58 to form a leakproof seal.

The intermediate section 54 is provided at its upper end with a radially extending flange 60 that carries a series of studs 61. These studs extend through a flexible diaphragm 62 and a flange 63 formed on the cover 55. A nut 64 threaded on each of the studs 61 clamps the marginal portion of the diaphragm 62 between the flanges 60 and 63 to thus secure the cover 55 and diaphragm 62 to the intermediate section 54.

The cover 55 is dished or recessed to provide a pressure or diaphragm chamber 65 at the upper side of the diaphragm 62 adapted to receive operating fluid under pressure to effect closing of the valve B. The central portion of the diaphragm 62 is clamped between plates 66 and 67, the former being disposed within the chamber 65 and the latter within the intermediate section 54. A main valve stem section 68 extends through the plate 66 and diaphragm 62 and has a shoulder 69 engaging the plate 67 and a threaded portion 70 adapted to receive a self-locking nut 71 engageable with the plate 66, whereby to maintain said main valve stem section, plates and diaphragm in assembled relation. The main valve stem section 68 is provided with an axial passage 72 which telescopically and slidably receives the upper end of a second or auxiliary valve stem section 73. The auxiliary valve stem section 73 is shouldered as indicated at 74 and projects through a valve disc 75. The valve disc 75 is provided with an annular recess 75a and has an annular sealing ring member 76 disposed in said recess which is cooperable with the seat 50 to cut off flow between the inlet chamber 46 and the outlet chamber 47 of the valve B. A washer 77 engages the inner portion of the lower side of the sealing ring 76 to retain the same in place. The auxiliary valve stem section 73 extends through the washer 77 and is threaded at 73a for the reception of a self-locking nut 78 which secures said valve disc and washer to said auxiliary valve stem section. Suitable spacing means, such as a fiber washer 79, permits the necessary clamping pressure to be applied to the disc 75 and washer 77 without undue distortion of the sealing member 76. The lower end of the main valve stem section 68 is adapted to engage the shoulder 74 on the auxiliary valve stem section 73 as shown in the drawing, to cause the sealing member 76 carried by the disc 75 to engage the seat 50 when operating fluid under pressure flexes the diaphragm 62 downwardly to effect positive closing of the valve B against line pressure.

The intermediate section 54 includes a cylindrical wall portion 81 which extends upwardly from the transverse wall 56 and lies between the flanges 57 and 60. The wall 81 is provided with one or more vent openings 82 which are disposed immediately above the wall 56 and establish communication between the interior of the intermediate section 54 and the atmosphere. The wall 56 has a central boss 56ª which receives a gland 83 having a bore 83ª serving as a guide for the main valve stem section 68, said gland being provided with a groove 83ᵇ at the lower inner surface thereof and having a packing ring 84 (normally circular in transverse cross-section) disposed in said groove to form a seal between said gland and the outer surface of the main valve stem section 68, whereby to prevent leakage from the outlet chamber 47 along the outside of said main valve stem section. Additional packing means 85 is disposed between the lower end of the gland 83 and an inwardly extending flange 56ᵇ carried at the lower end of the boss 56ª. The packing 85 serves to prevent leakage between the gland 83 and the adjacent surface of the boss 56ª. Bolts 83ᶜ compress the packing 85 and secure the gland 83 in place.

It will be apparent that if any liquid should leak along the main valve stem section 68 from the outlet chamber 47 of the valve body B, or if any leakage should occur along said main valve stem section from the diaphragm chamber 65, or if the diaphragm 62 should fail and leak, the leakage will flow out of the intermediate valve section 54 through the vent openings 82. The openings 82 thus serve to reveal malfunctioning of the parts of the check valve B, and at the same time indicate that said valve requires immediate inspection and possibly repair.

While the gland 83 serves as a guide for the lower portion of the main valve stem section 68, the upper portion thereof is guided in a bushing 86 mounted at the lower end of a passage 87 in the cover 55, the passage 87 being closed at its upper end by a plug 88. The auxiliary valve stem section 73 is guided in its movements by the walls of the axial passage 72 formed in the main valve stem section 68. Operating fluid is admitted into and exhausted from the pressure chamber 65 through a passage 89, which may be conveniently formed in any one of a plurality of bosses 55ª on the cover 55; the passage not in use is closed by a plug 55ᵇ. A conventional elbow fitting 301 may be mounted on the outer end of the passage 89 and one end of a conduit 300 may be connected to said fitting, the opposite end of said conduit being connected with a pilot valve or other control means (not shown).

It will be apparent that, with the foregoing structural arrangement of the valve B, it is impossible for any interchange of fluid to occur between the outlet chamber 47 of the valve B and the diaphragm chamber 65 of said valve. Instead, leakage from either of the chambers 47 and 65 is exhausted to the atmosphere through the vent openings 82, so that when the valve is employed in a backflow unit, for example, it is impossible for polluted water to enter the pipe line in which the valve B is connected by the by-passing of fluid through said valve.

Assuming that the conduit 300 is conditioned to exhaust operating fluid from the diaphragm chamber 65, the pressure of the water in the inlet chamber 46 against the underside of the valve disc 75 will raise said disc from its seat and flex the diaphragm 62 upwardly, whereby to force spent operating fluid from the diaphragm chamber 65 and permit the flow of water through the valve B. One or more abutments 55ᶜ on the inner side of the cover 55 are adapted to be engaged by the plate 66 to limit the upward movement of the main valve stem section 68.

If it is assumed that a static condition occurs in the pipe line (not shown) with which the valve B is associated, that is, a condition wherein the pressure in the inlet chamber 46 is substantially equal to the pressure in the outlet chamber 47, then the disc 75 will seat itself by gravity, downward movement thereof being permitted independently of the main valve stem section 68 by virtue of the telescopic connection between said main valve stem section and the auxiliary valve stem section 73. Hence, even though the diaphragm chamber 65 of the valve B may be open to exhaust, no reverse flow can take place due to the closing of said valve by gravity.

On the other hand, if it is desired to close the valve B against line pressure, then operating fluid under pressure is admitted into the diaphragm chamber 65 through the conduit 300 and passage 89. As the pressure builds up in the diaphragm chamber 65, the diaphragm 62 is flexed downwardly forcing the main valve stem section 68 to travel in the same direction. The main valve stem section 68 exerts a downward force on the auxiliary valve stem section 73 because of the engagement of the lower end thereof with the shoulder 74 on the auxiliary valve stem section 73. The effect of this is to force the disc 75 toward the seat 50 against the pressure of the water flowing through the valve B so that said valve is positively closed against line pressure and the hammering and noise common in check valves that close by moving in the direction of flow, instead of against it, is entirely eliminated.

Manifestly, the valve B will not again open until the pressure chamber 65 has been opened to exhaust, and the pressure in the inlet chamber 46 is sufficient to raise the disc 75 from its seat to permit flow through said valve.

It will be understood that changes may be made in the details of construction and arrangement of the combined gravity and power operated check valve disclosed herein without departing from the spirit of the invention or the scope of the annexed claim.

What I claim is:

A combined gravity and fluid pressure operated check valve comprising: a valve body, a cover and an intermediate section disposed between said valve body and cover, said valve body having inlet and outlet chambers and a seat between said chambers, said valve body being further provided with an opening above and completely separated from said seat by an intervening portion of said outlet chamber, said intermediate section including a cylindrical wall portion and horizontal flanges extending outwardly therefrom at the upper and lower ends thereof; a gasket interposed between said valve body and the lower flange of said intermediate section;

means securing said lower flange of said intermediate section to said valve body and compressing said gasket to form a seal therebetween; a flexible diaphragm interposed between the upper flange of said intermediate section and said cover; means clamping the marginal portion of said diaphragm between said cover and said upper flange of said intermediate section and securing the same together in assembled relation, said cover being recessed to provide a pressure chamber above said diaphragm and having passage means for admitting operating fluid into and exhausting operating fluid from said pressure chamber, said intermediate section having a transversely extending wall overlying and forming a closure for the opening in said valve body, said wall having a central boss; a main valve stem section connected to said diaphragm and extending through said boss; a bushing in said cover slidably receiving the upper end of said main valve stem section; a gland mounted in said boss and forming a guide for the lower portion of said main valve stem section; packing means carried by said gland normally forming a seal between said gland and said main valve stem section; packing means arranged to form a seal between said gland and said boss, whereby to prevent leakage from said outlet chamber into said intermediate section; means securing said main valve stem section to said diaphragm including a supporting plate disposed in said intermediate member at the lower side of said diaphragm, a supporting plate disposed at the upper side of said diaphragm and a nut threaded on said main valve stem section and engaging said last-mentioned supporting plate, said main valve stem section having an axial bore; an auxiliary valve stem section slidably received in said bore; a valve disc carried by said auxiliary valve stem section; and sealing means on said valve disc cooperable with said seat to form a seal therewith to prevent flow through said valve body, said valve disc being adapted to seat by gravity independently of actuation of said diaphragm by virtue of the sliding connection between said valve stem sections, said cylindrical wall of said intermediate section having at least one vent opening for the discharge of any leakage which occurs along said main valve stem section from either said outlet chamber or said pressure chamber and for the discharge of operating fluid from said pressure chamber in the event of failure of said diaphragm, whereby all interchange of fluid between said pressure chamber and said outlet chamber is precluded.

DONALD G. GRISWOLD.

REFERENCES CITED

The following references are of record in the file of this patent:

UNITED STATES PATENTS

| Number | Name | Date |
|---|---|---|
| 615,881 | McIntosh | Dec. 13, 1898 |
| 645,208 | Mayer | Mar. 13, 1900 |
| 703,757 | Bickford | July 1, 1902 |
| 1,188,061 | Franquist | June 20, 1916 |
| 1,236,216 | Schuler | Aug. 7, 1917 |
| 1,369,444 | Koplin | Feb. 22, 1921 |
| 1,944,485 | Andersen | Jan. 23, 1934 |
| 2,233,395 | Blanchard | Mar. 4, 1941 |

FOREIGN PATENTS

| Number | Country | Date |
|---|---|---|
| 430,241 | France | Aug. 5, 1911 |
| 730,977 | France | May 24, 1932 |